United States Patent [19]

Lynne

[11] Patent Number: 5,671,334
[45] Date of Patent: Sep. 23, 1997

[54] NEURAL NETWORK MODEL FOR REACHING A GOAL STATE

[75] Inventor: Kenton Jerome Lynne, Rochester, Minn.

[73] Assignee: International Business Machines Corporation, Armonk, N.Y.

[21] Appl. No.: 932,429

[22] Filed: Aug. 19, 1992

Related U.S. Application Data

[62] Division of Ser. No. 790,806, Nov. 12, 1991, Pat. No. 5,172,253, which is a division of Ser. No. 541,570, Jun. 21, 1990, Pat. No. 5,113,482.

[51] Int. Cl.$^6$ ............................................. G06F 15/18
[52] U.S. Cl. ............................................. 395/21; 382/156
[58] Field of Search .................................. 364/460, 461, 364/424.02; 395/21, 913, 90, 23, 85; 901/1

[56] References Cited

U.S. PATENT DOCUMENTS

| | | | |
|---|---|---|---|
| 4,500,970 | 2/1985 | Daemmer | 364/513 |
| 4,862,373 | 8/1989 | Meng | 364/444 |
| 4,888,707 | 12/1989 | Shimada | 364/513 |
| 4,933,871 | 6/1990 | DeSieno | 364/513 |
| 5,083,256 | 1/1992 | Trovato | 364/148 |
| 5,124,918 | 6/1992 | Beer et al. | 364/424.02 |

*Primary Examiner*—Allen R. MacDonald
*Assistant Examiner*—Susan Wieland
*Attorney, Agent, or Firm*—Curtis G. Rose; Steven W. Roth

[57] ABSTRACT

An object, such as a robot, is located at an initial state in a finite state space area and moves under the control of the unsupervised neural network model of the invention. The network instructs the object to move in one of several directions from the initial state. Upon reaching another state, the model again instructs the object to move in one of several directions. These instructions continue until either: a) the object has completed a cycle by ending up back at a state it has been to previously during this cycle, or b) the object has completed a cycle by reaching the goal state. Upon reaching a state, the neural network model calculates a level of satisfaction with its progress towards reaching the goal state. If the level of satisfaction is low, the neural network model is more likely to override what has been learned thus far and deviate from a path known to lead to the goal state to experiment with new and possibly better paths. If the level of satisfaction is high, the neural network model is much less likely to experiment with new paths. The object is guaranteed to eventually find the best path to the goal state from any starting location, assuming that the level of satisfaction does not exceed a threshold point where learning ceases.

6 Claims, 9 Drawing Sheets

| Action Unit vectors in Storage | States | | | | |
|---|---|---|---|---|---|
| | 1 | 2 | 3 | ... | N |
| Pw (Permanent Weight) | | | | ...... | |
| Tw (Temporary Weight) | | | | ...... | |
| Ra (Reinforcement Accumulator) | | | | ...... | |
| Rb (Reinforcement Baseline) | | | | ...... | |
| Hist (History) | | | | ...... | |

FIG. 2A

NEURAL NETWORK MODEL FOR REACHING A GOAL STATE

This is a divisional of application Ser. No. 07/790,806, filed on Nov. 12, 1991, now U.S. Pat. No. 5,172,253, which was a divisional of application Ser. No. 07/541,570, filed on Jun. 21, 1990, now U.S. Pat. No. 5,113,482.

FIELD OF THE INVENTION

This invention relates to the data processing field. More particularly, this invention is a neural network model for reaching a goal state in an efficient manner.

BACKGROUND OF THE INVENTION

The human brain is made up of a group of neurons connected to one another in a network. When we learn something, new connections are made or existing connections are modified between the neurons.

Neural networks are massively parallel computing models of the human brain, consisting of many simple processors connected by adaptive weights. Neural networks are being used in artificial intelligence-related applications. The parallel neural networks are often simulated on serial computers, with the processors simulated by program code, and the connections modeled by data.

Most present day neural network models, such as the Back propagation model, are supervised neural network models. Supervised neural networks models differ from conventional programs in that a programmer does not write algorithmic code to tell them how to process data. Instead, a user 'trains' a neural network by presenting training data of the desired input/output relationships.

Other neural network models are unsupervised neural network models. Unsupervised neural networks can extract statistically significant features from input data. This differs from supervised neural networks in that only input data is presented to the network during training.

Regardless of whether a neural network model is supervised or unsupervised, most models today learn by receiving immediate reinforcement each time they perform a function. While this immediate reinforcement approach works well with many types of basic neural network applications, it does not work well for more complex neural network applications, where it is not possible or meaningful to give immediate reinforcement each time a function is performed. For example, if it is desired to teach a robot to find a "goal state", such as a tool bin, the robot doesn't know if it is heading in the right direction until it actually finds the tool bin. Attempts to provide immediate reinforcement after each movement have proven to be ineffective.

Publications by Barto et al have attempted to solve this problem by introducing the concept of delayed reinforcement. In this approach, the neural network controlling the robot would not get any reinforcement until if found the parts bin. The Barto et al approach uses a temporal difference method which uses the concept of gradient descent to adjust connectionist weights slowly based on the gradient.

While the Barto et al approach represents a significant advancement over other neural network models, it is not without its shortcomings. For example, any gradient descent approach is not guaranteed to find the best path to a goal state, since it can become "trapped" in a local minimum on an error surface. Therefore, the Barto et al neural network model can easily become tricked into thinking it has found the most optimal path when in fact it has not. This is a serious shortcoming, since merely finding a "good" path is nowhere near as desirable as always finding the "best" path.

An analogy will help explain the Barto et al approach. Barto's neural network model is like riding a bicycle on a very hilly road—where the bicyclist's objective is to find the deepest valley on the road. When a bicyclist is in a valley, he may think he is in the deepest valley if he cannot see any valleys deeper than the one he is in, and be content to stay in that valley. Unknown to the bicyclist, however, is that there is a much deeper valley two hills away that he cannot see.

Another shortcoming of a neural network model using the Barto et al approach is that it is not given immediate feedback that it is on an unproductive path. If our robot, in its quest for the parts bin, finds itself visiting the same location more than once, it has wasted valuable time inefficiently going around in circles. Barto et al's neural network model does nothing to stop this unproductive path unless a predetermined maximum number of steps are exceeded. Therefore, the robot can visit many locations more than once before the neural network model finally determines that it is lost and needs to start over. This approach is inefficient and a waste of valuable time.

Barto et al and the prior art approaches have failed to adequately address the above problems. The prior art has largely been confined to theoretical and experimental applications that are unsuitable for commercial environments.

SUMMARY OF THE INVENTION

It is a principal object of the invention to provide a neural network model capable of learning efficiently with delayed reinforcement.

It is another object of the invention to provide a neural network model that is guaranteed to find the best possible path to a goal state.

It is another object of the invention to provide a neural network model that can immediately detect that the neural network has visited the same state more than once during this cycle, and end the cycle and begin a new cycle at the present location.

It is another object of the invention to provide a neural network model that contains an indication as to how satisfied it is with the path chosen to reach a goal state, and be less likely to deviate from this path as it becomes more satisfied.

These and other objects are accomplished by the neural network model for reaching a goal state disclosed herein.

An object, such as a robot, is located at an initial state in a finite state space area and moves under the control of the unsupervised neural network model of the invention. The network instructs the object to move in one of several directions from the initial state. Upon reaching another state, the model again instructs the object to move in one of several directions. These instructions continue until either: a) the object has completed a cycle by ending up back at a state it has been to previously during this cycle, or b) the object has completed a cycle by reaching the goal state. If the object ends up back at a state it has been to previously during this cycle, the neural network model is punished by ending the cycle and immediately beginning a new cycle from the present state. When the object reaches the goal state, the neural network model learns that this path is productive towards reaching the goal state, and is given delayed reinforcement in the form of a "reward".

Upon reaching a state, the neural network model calculates a level of satisfaction with its progress towards reaching the goal state. If the level of satisfaction is low, the neural network model is more likely to override what has been learned thus far and deviate from a path known to lead to the goal state to experiment with new and possibly better paths. If the level of satisfaction is high, the neural network model is much less likely to experiment with new paths. The object is guaranteed to eventually find the best path to the goal state from any starting location, assuming that the level of satisfaction does not exceed a threshold point where learning ceases.

If an obstruction is detected in the best known path to the goal state, the neural network model instructs the object to look for an alternate route. This lowers the level of satisfaction, making the neural network model more likely to experiment with new paths. When the obstruction is removed, the neural network model will eventually experiment and find the previous path.

If a new route is opened that results in a better path to the goal state, the neural network model will eventually experiment and find the new path. The speed at which the neural network model finds the better path depends on the level of satisfaction.

BRIEF DESCRIPTION OF THE DRAWING

FIG. 2A shows the action unit's storage area in more detail.

DESCRIPTION OF THE PREFERRED EMBODIMENT

Figure 1:
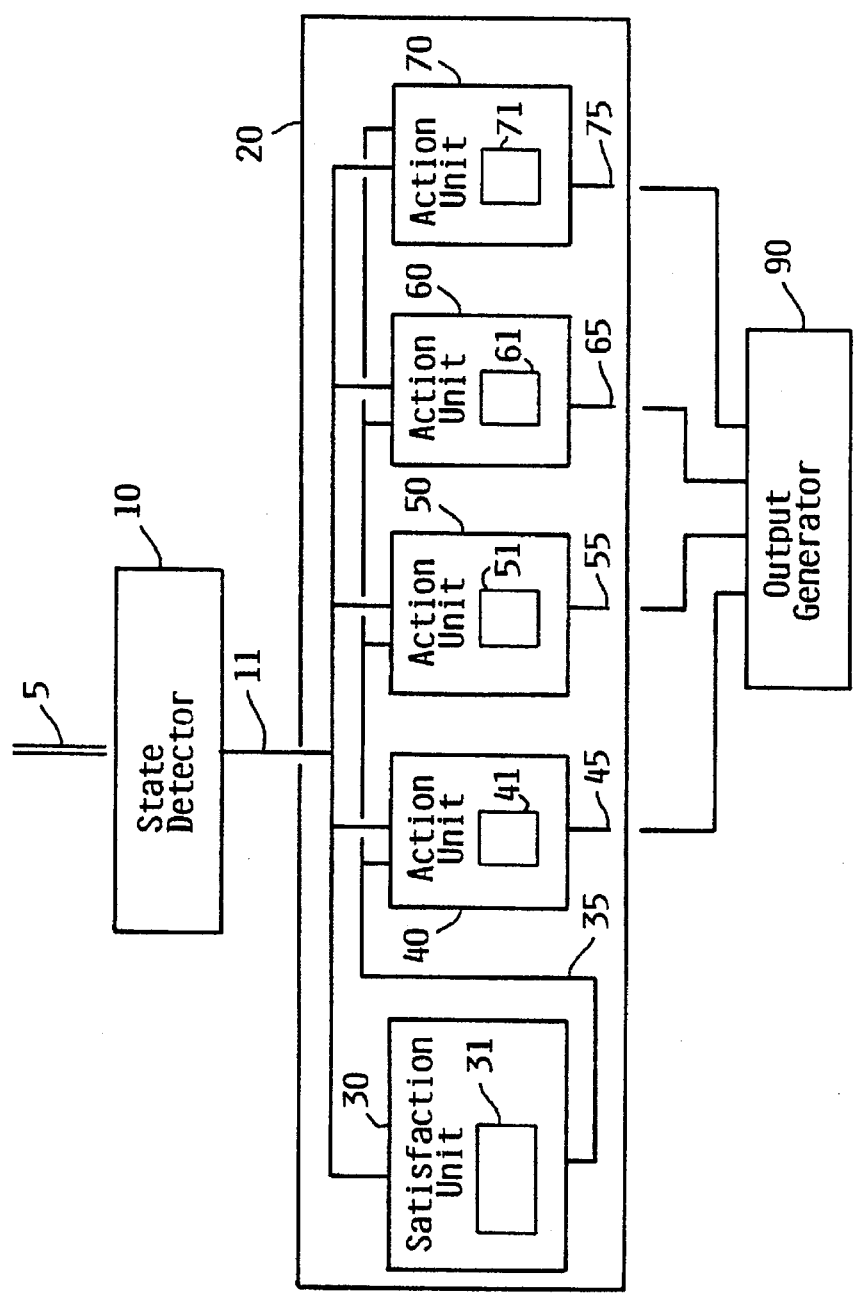
FIG. 1 shows a block diagram of the invention.

FIG. 1 shows a block diagram of the invention. State detector 10 receives an indication of the current state through input line 5, and outputs this state information to neural network model 20 on output line 11. State detector 10 could be anything capable of sensing state information and outputting this information to neural network model 20, will vary depending on the specific implementation, and is beyond the scope of this invention. For example, state detector 10 could be a RF receiver capable of receiving and decoding unique RF signals transmitted from different locations in a city or manufacturing plant. A special RF signal could be present at the goal state so that neural network model 20 will know when the goal state is reached.

Neural network model 20 contains satisfaction unit 30 and action units 40, 50, 60, and 70. Satisfaction unit 30 and action units 40, 50, 60 and 70 contain storage areas 31, 41, 51, 61, and 71, respectively. In the preferred embodiment, satisfaction unit 30 and action units 40–70 are each individualized microprocessors, such as Intel 8088 microprocessors, suitably programmed as shown in FIG. 2B and FIGS. 3A–3E. Individualized microprocessors allow neural network model 20 to operate at a high rate of speed by operating in parallel. In an alternate embodiment, a single processor, such as an Intel 80286, suitably programmed as shown in FIG. 2B and FIGS. 3A–3E, is used to simulate the activity of satisfaction unit 30 and action units 40–70. In the preferred and alternate embodiment, storage areas 31, 41, 51, 61, 71 are part of the local storage of the microprocessor(s), although these storage areas could be located in a separate storage area, such as RAM or on a disk unit, magnetic tape, etc.

Although four action units 40–70 are shown in FIG. 1, neural network model 20 could contain anywhere from one to thousands of action units, depending on the implementation. Typically, neural network model 20 will contain one action unit for each motor or degree of freedom to be controlled. For example, if the object to be controlled is a robot which is capable of moving north, south, east, and west, neural network model 20 will typically contain four action units. If the object is a robotic arm with three degrees of freedom, neural network model 20 will typically contain three action units. If the object to be controlled is a train which can only move forward or stop, neural network model 20 may only contain one action unit. In any event, each action unit has an output line connected to the output generator. FIG. 1 shows that action units 40, 50, 60 and 70 are connected to output generator 90 via output lines 45, 55, 65, and 75, respectively. Output generator 90 typically contains one stepper motor (well known to those skilled in the art) per action unit. The stepper motors in output generator 90 work together to move the object. The actual design of output generator 90 is highly dependent on the specific implementation and is beyond the scope of the invention.

The range of output values that the action units generate depends on the particular requirements and capabilities of output generator 90 used in the specific application. In the most straightforward implementation, the outputs from neural network 20 accepted by the output generator 90 are binary—either a '0' (off) or a '1' (on) value. As will be discussed in more detail later, the action units of neural network model 20 generate an output of '1' when the effective weight for the active state line is positive, and '0' otherwise. However in some cases output generator 90 may accept or even require a range of values (perhaps ranging from negative to positive real values). In this later case, the output produced by the action units will be some continuous monotonically increasing function of the effective weight for the active state line.

Satisfaction unit 30 is responsible for setting a value for a "satisfaction index". The satisfaction index determines the level of satisfaction with the progress made towards finding the best path to the goal state. The higher the satisfaction index, the less likely the neural network would override what has been learned and leave a proven path in an experimental attempt to find a better path. The "satisfaction index" is sent to all action units on output line 35. The operation of satisfaction unit 30 will be described in more detail in FIG. 2B.

In the preferred embodiment, each component contained in neural network model 20 operates synchronously, either via a synchronized internal clock or via a signal generated from a common clock (not shown). Satisfaction unit 30 executes the flowchart shown in FIG. 2B. All action units synchronously and independently execute the flowchart shown in FIGS. 3A–3E. Alternately, when the network model is run on a single processor that simulates the network, this synchronization is enforced as a natural result of the simulation software giving control to each part in a specific order.

For example, at time t=0, state detector 10 processes environmental input and decides what state the external environment is in. At time t=1, state detector 10 sends the appropriate state information to neural network model 20 on output line 11. At time t=2, action units 40–70 simultaneously detect which state is the current state and decide what their output will be. At time t=3, the action units generate their output on output lines 45, 55, 65, and 75.

Output generator 90 uses the output from the action units to (if valid) perform some physical action which results in a change to the external environment which (if valid) will be detected by state detector 10 at t=4. The above process then continues until a "cycle" is completed. A cycle is completed whenever: a) the object ends up back at a state it has been to previously during this cycle, or b) the object reaches the goal state.

FIG. 2A shows storage areas 41, 51, 61, and 71 of action units 40-70 in more detail. Note that each storage area contains vectors 81-85 for each possible state output decoded by and passed to neural network model 20 via state detector 10.

The values in these storage locations are referred to in the flowcharts of FIGS. 3A-3E as arrays with the parenthesized names where the index of the array refers of state 1 through N. For example Pw(3) would represent the permanent weight associated with state 3.

Permanent weight vector 81 represents the accumulated learned strength of the connection between the state and the action unit. Although the range of allowable values may depend on the specific application, typically they will be real-valued within the range of −1.0 to 1.0 with a positive value causing the action unit to generate a positive output. Negative values cause either no output or a negative output. Before learning begins, all permanent weights are normally set to 0.

Temporary weight vector 82 represents a "guess" by the action unit as to how to change its response to a particular state during the current cycle. Since the temporary weight and the permanent weight are summed together in deciding what the action unit's response will be to a particular external state, the temporary weight can "override" or reverse the permanent weight if it is large enough and of opposite sign to the permanent weight. Thus the range of allowable temporary weight usually will be the same as the permanent weights.

Entirely new values for the temporary weights are selected on every new cycle and are modulated by the value of the "satisfaction index" as determined by satisfaction unit 30. The satisfaction index determines the level of satisfaction with the progress made towards finding the best path to the goal state. When this index is very high, the range from which the temporary weights are selected is made very narrow, making it less likely that a permanent weight will be overridden. The network's behavior will therefore be very predictable, following closely with what the permanent weights dictate. In the preferred embodiment, a threshold value is set where, if ever exceeded by the satisfaction index, learning stops. Typically, this threshold value is set sufficiently high that it cannot be exceeded by the satisfaction index. This means that the neural network can always learn more, and be open to experimentation that may lead to a better (perhaps newly opened) path.

When the satisfaction index is low, the temporary weights selected from the range will be skewed towards the extremes of the range, making it much more likely that permanent weights will be overridden and thus making the network's behavior more unpredictable and exploratory.

Referring again to FIG. 2A, reinforcement accumulator vector 83 contains the amount of reinforcement generated by the action unit for each state since the time each state was detected within the current cycle. Reinforcement in the form of a "reward" would result in a positive number, while reinforcement in the form of a "punishment" would result in a negative number. At the start of each cycle the reinforcement accumulator for all states is set to 0.

Reinforcement baseline vector 84 contains, for each state, the maximum amount of reinforcement that has been received by that state during all the cycles that make up the learning process. At the beginning of training, the reinforcement baseline is initially zero. The allowable values are the same as for the reinforcement accumulator. When a cycle ends, the amount of reinforcement in vector 84 divided by history vector 85 is compared to that in accumulator vector 83 in deciding whether the behavior of the network during the just completed cycle was an improvement over previous cycles and thus whether the temporary weights should become part of the permanent weights.

History vector 85 for each state contains a value that represents if and how long ago that state was detected within the current cycle. It is convenient to represent the history as a positive integer with 0 representing the fact that a state has not yet been active during the current cycle. At the beginning of each cycle, history vector 85 is set to 0 for all states. When a new state is detected, its value in history vector 85 is set to 1 and the history values for all states that have been previously active during the current cycle are incremented. Alternatively, one could use an equivalent scheme whereby history vector 85 is real valued to 0 to 1.0, where an initially active state is set to 1.0 and then decays monotonically throughout the rest of the cycle. What is important is that from a snapshot of all the history values at any point in the cycle, one can determine exactly which states have occurred during the cycle and in what order. This is necessary so that the distance from the goal state and thus the amount of reinforcement that each state receives due to reaching the goal state can be calculated. This ensures that the neural network will recognize, learn and remember when it has found a shorter path to the goal state.

In the preferred embodiment, each storage unit 41, 51, 61, and 71 will normally contain different information for these vectors, but all action units are programmed in the same manner, and independently but synchronously execute the flowcharts shown in FIGS. 3A-3E. The end result is that each action unit learns independently, and the combined learning of all action units results in the desired control of output generator 90.

Figure 2B:
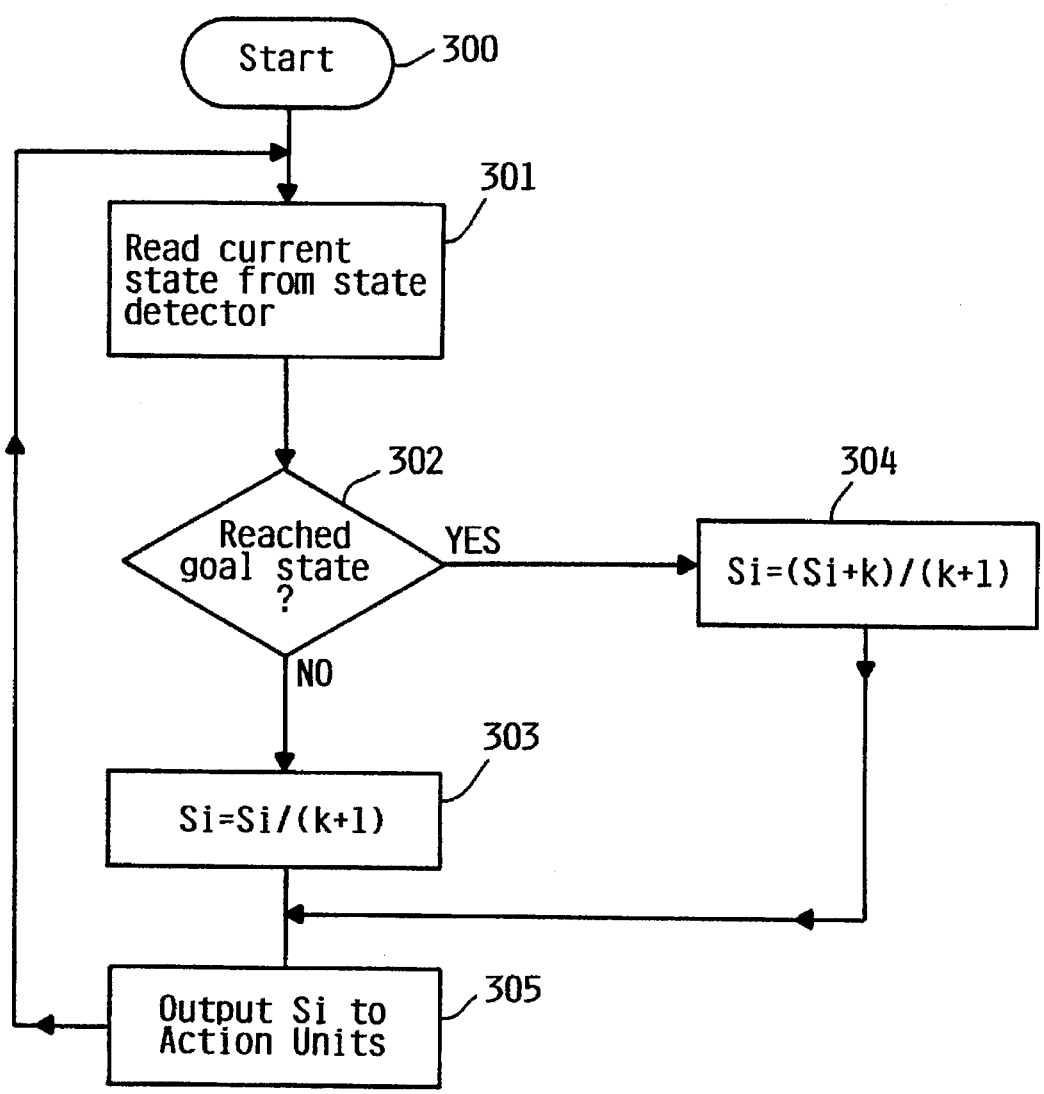
FIG. 2B shows how the satisfaction unit is programmed in the invention.

FIG. 2B shows how satisfaction unit 30 is programmed to provide a satisfaction index for all action units. Block 301 reads the current state from state detector 10. Block 302 asks if the current state is the goal state. If not, the satisfaction index Si is set to be equal to Si/(k+1). Note that Si=0 until the goal state is reached for the first time, indicating the lowest possible level of satisfaction. When block 302 detects that the goal state has been reached, block 304 sets Si=(Si+k)/(k+1).

In the preferred embodiment, the value "k" is a constant that specifies how fast the recent reinforcement "decays" (or conversely, how much previous events are weighted in the current timeframe). A value of 1.00 for k would mean that the importance of past events declines by a half at each network step; a value of 0.10 means that past events count 9 times as much as the current event; a value of 9.00 would mean that current events count 9 times as much as past events. Thus the higher the k value, the faster the satisfaction index will change and the quicker the network will swing between the extremes of wild exploration and rock-steady stability in its learning strategy.

Block 303 shows how the satisfaction index is decreased in the preferred embodiment when the current state is not the goal state, while block 304 shows how the satisfaction index is increased in the preferred embodiment when the current state is the goal state. Those of skill in the art could easily substitute other equations for those shown in block 303 and block 304 to calculate the satisfaction index differently based on different criteria from that used in the preferred embodiment.

Block 305 outputs the value for the satisfaction index to all action units on output line 35, and returns to block 301 to read the next state from state detector 10. Note that satisfaction unit 30 continuously runs the flowchart of FIG. 2B and provides an updated satisfaction index at each state to the action units.

Figure 3A:
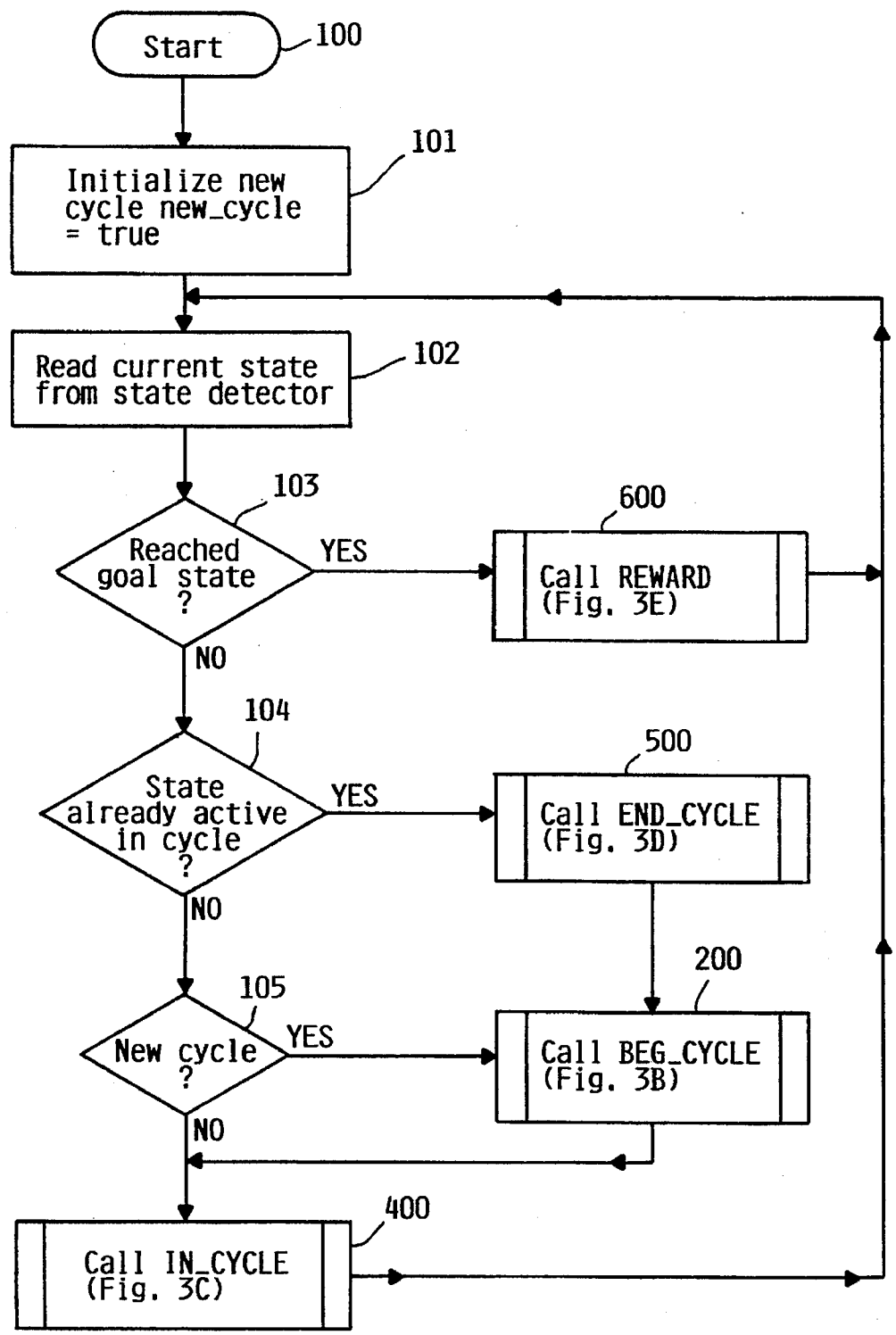
FIGS. 3A–3E show how the action units are programmed in the invention.

The flowcharts of FIG. 3 will now be discussed. Referring first to FIG. 3A, block 101 initializes the network to begin a new cycle. Block 102 reads the current state from state detector 10. Block 103 asks if the current state is the goal state. If not, block 104 checks to see if the current state has already been active in the current cycle. If the current state is active, this means that the network has taken an unproductive path, because it has visited the same state more than once. If block 104 is answered negatively, block 105 checks to see if this is a new cycle. If so, subroutine BEG_CYCLE of FIG. 3B is called in block 200.

Figure 3B:
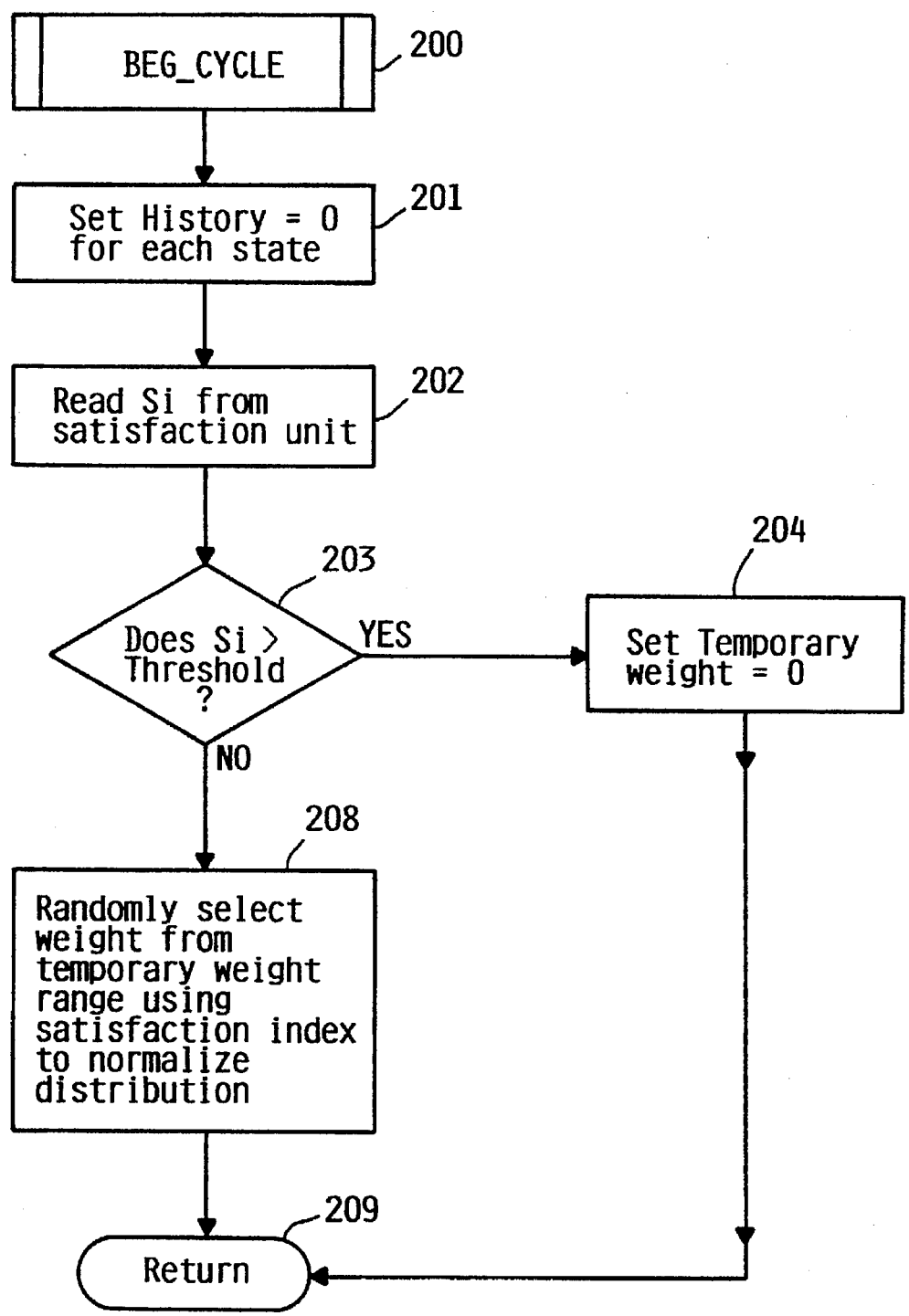

Referring now to FIG. 3B, block 201 sets all history values in history vector 85 to zero. This is done to indicate that no states have been visited yet. Block 202 reads the satisfaction index sent from satisfaction unit 30 in block 305 of FIG. 2B. Block 203 asks if the satisfaction index exceeds a threshold value. If so, block 204 assigns a temporary weight of zero for each temporary weight value in temporary weight vector 82. This will assure that no further learning will occur and the network will not deviate from what it considers to be the "optimal" path at this time as long as the satisfaction index exceeds the threshold value. If the threshold is not exceeded, block 203 is answered negatively. In the preferred embodiment, the threshold value is set higher than the satisfaction index is capable of reaching, to assure that some learning will always be possible.

Block 208 randomly selects a weight from the temporary weight range as normalized by the satisfaction index. This normalization can be done in many different ways known to those skilled in the art. In the preferred embodiment, Si is used to modify a Gaussian distribution from which the set of temporary weights are being selected. When the satisfaction index is low (say, 0) the distribution of temporary weights is flat or even inverted between the ranges of −1.0 and 1.0, making it more likely that a weight at one of the extremes will be selected and thereby override the permanent weight. When the satisfaction index is very high (say very near 1.0), the temporary weight distribution will be a very "narrow" Gaussian (or equivalently a normal distribution with a very small standard deviation), making it very unlikely that a weight in the extremes will be chosen and thereby less likely that it will override the permanent weight. A Gaussian distribution will always leave open the possibility that learning could occur (even at six sigma and beyond) and deviate from a path known to lead to the goal state, although this becomes less likely to happen as the satisfaction index increases.

Regardless of how block 203 is answered, the subroutine eventually returns to block 400 in FIG. 3A.

Figure 3C:
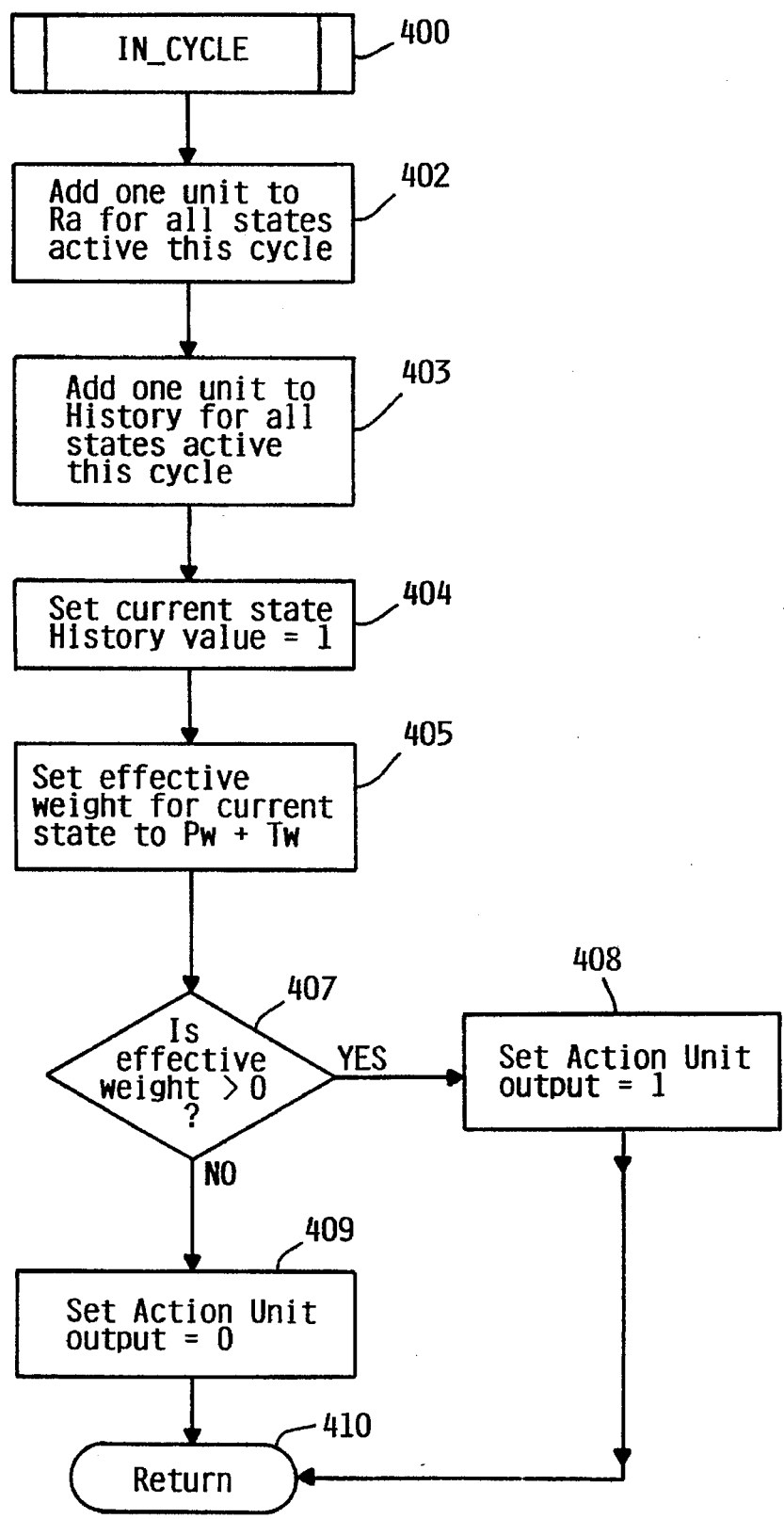

Block 400 calls the IN_CYCLE subroutine of FIG. 3C. Referring now to FIG. 3C, block 402 adds one unit to the reinforcement accumulator values for all states active during this cycle in reinforcement accumulator vector 83. Block 403 adds one unit to the history values for all states active during this cycle in history vector 85. Blocks 402 and 403 provide enough information to not only tell that a state has been active, but the order that the states were visited. For example, blocks 402 and 403 increments the reinforcement accumulator and history values associated with a state visited two steps ago from two to three, and increments the reinforcement accumulator and history values associated with a state visited one step ago from one to two. Block 404 sets the current state history to one. This is done to set the current state history (which is 0) to 1 to show that this state was active during the cycle the next time IN_CYCLE is executed. Block 405 calculates an effective weight for the current state to be the sum of the permanent weight value stored in permanent weight vector 81 and the temporary weight value stored in temporary weight vector 82 for the current state. Block 407 checks to see if the effective weight is greater than zero. If so, the action unit running this process sends a "1" to output generator 90 over its output line, indicating that the neural network is telling the motor controlled by this action unit to move. If not, the action unit running this process sends a "0" to output generator 90 over its output line, indicating that the neural network is telling the motor controlled by this action unit not to move. The object controlled by the neural network (robot, etc) will attempt to move in the direction indicated by one or more of its motors becoming energized. In either event, the subroutine returns in block 410 to block 102 of FIG. 3A.

Figure 3D:
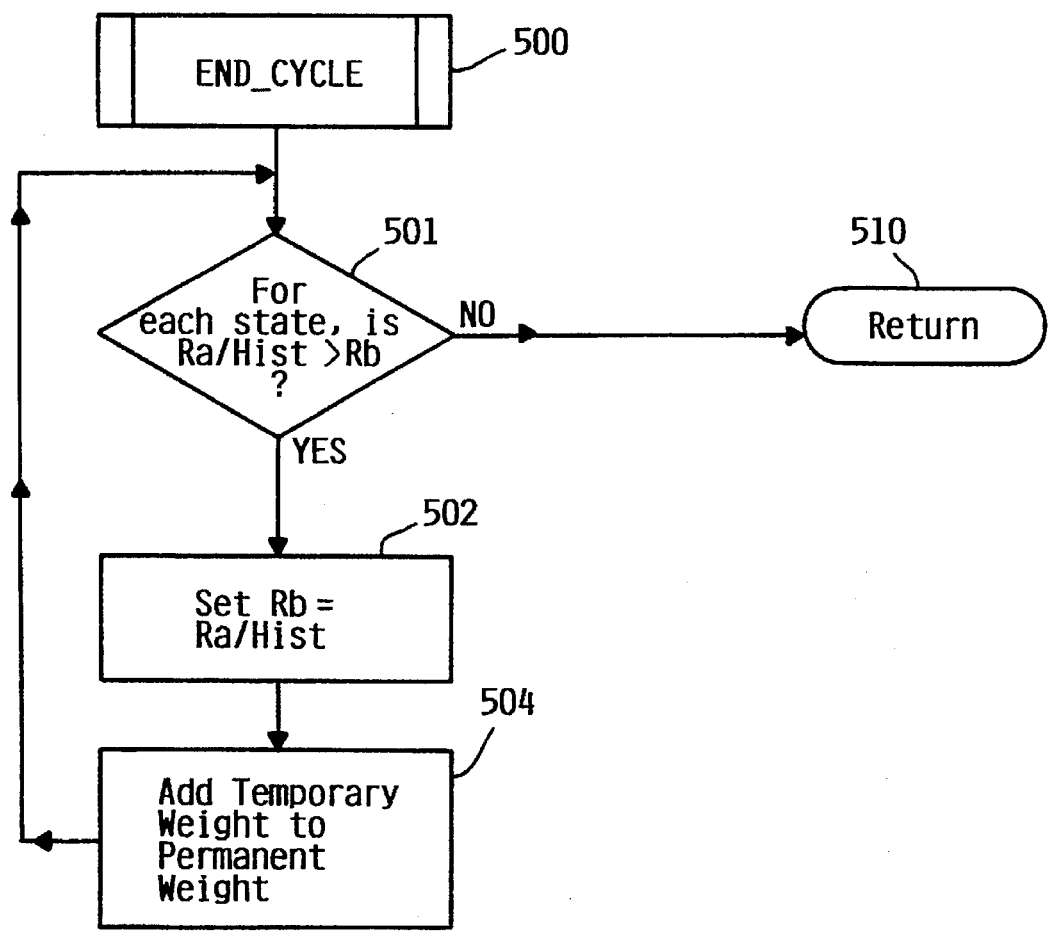

Referring again to FIG. 3A, blocks 103, 104, and 105 are all answered negatively and subroutine IN_CYCLE is called repeatedly until the cycle ends. If the cycle ends because block 104 detects a state already active in the cycle, subroutine END_CYCLE of FIG. 3D is called in block 500. Referring now to FIG. 3D, block 501 asks if the reinforcement accumulator value divided by the history value is greater than the reinforcement baseline value for each state. If this is true, it indicates that the path that this state was on that led to the goal state was reached in fewer steps than ever before and so we should remember this by incorporating those temporary weight that were responsible for making us take this better path. Block 501 can also be answered positively if a portion of a path was completed that didn't end up in a loop if and only if that portion of a path has never been found before and the portion doesn't overlap with any states that are on a path previously found to lead to the goal state. Block 502 sets the reinforcement accumulator baseline value for this state to be equal to the reinforcement accumulator value divided by the history value. Block 504 adds the temporary weight to the permanent weight. In the preferred embodiment, if this addition would exceed the limits of −1.0 or +1.0, block 504 increases the magnitude of the permanent weight to halfway between its current value and 1.0 (or −1.0, as the case may be).

If block 501 is answered negatively, the permanent weight for this state is not changed. After all stated have been looked at in block 501 and have executed blocks 502 and 504 (if appropriate), the subroutine returns in block 510 to block 200 of FIG. 3A, where a new cycle starts.

Figure 3E:
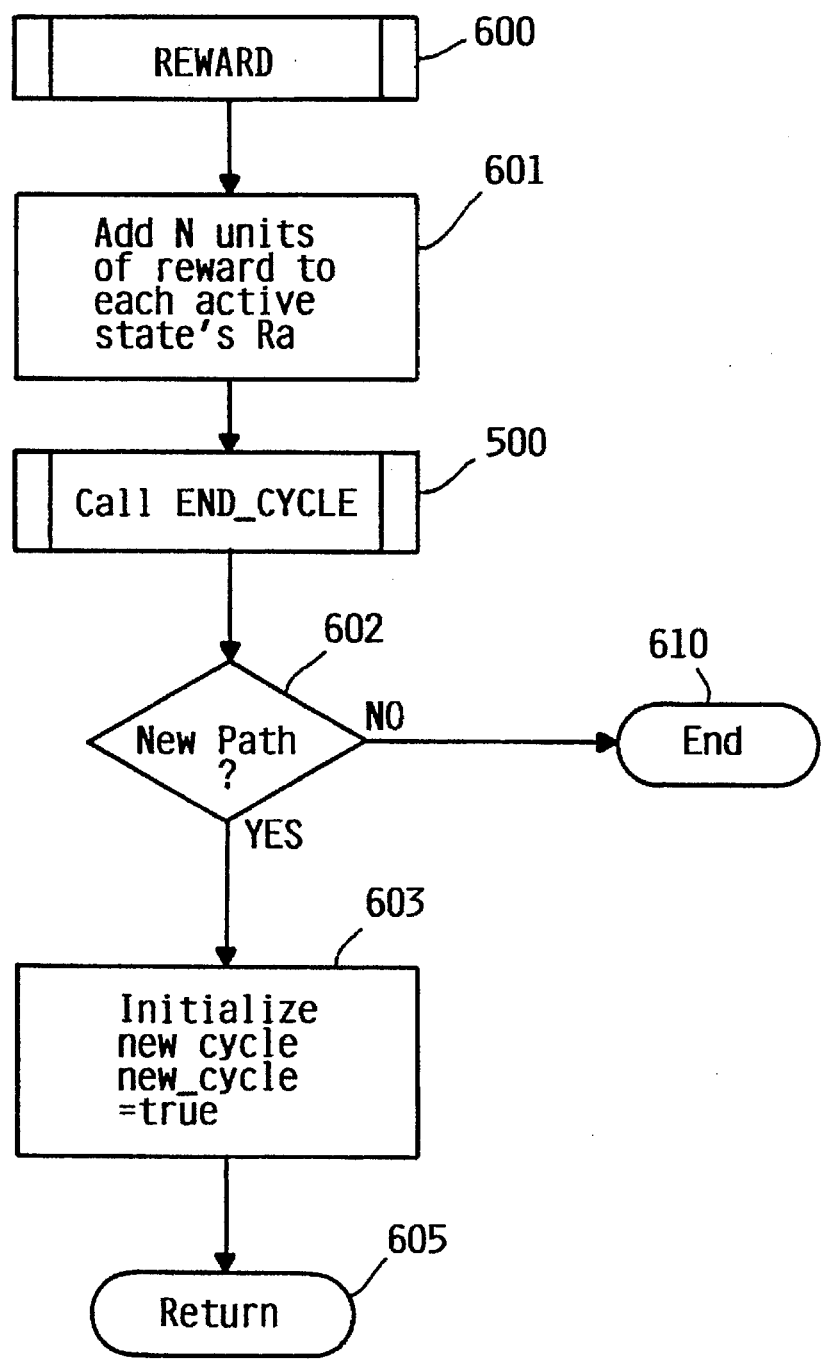

Referring again to FIG. 3A, if the cycle ends because block 103 detects that the current state is the goal state, the REWARD subroutine of FIG. 3E is called in block 600. Referring now to FIG. 3E, block 601 adds N units of reward to the reinforcement accumulator value for each state active during this cycle. In the preferred embodiment, N should be a large enough number such that it is equal to or exceeds the number of expected states that the network will encounter. In the map following example discussed below and shown in FIG. 4, N should be at least 14. Block 500 calls the END_CYCLE subroutine of FIG. 3D as previously discussed, except that block 510 returns to block 602 of FIG. 3E. Block 602 checks to see if the network has been put into another starting state. If so, block 603 indicates that a new cycle is to be started, and the subroutine returns in block 605 to block 102 of FIG. 3A. If not, the program ends in block 610.

Figure 4:
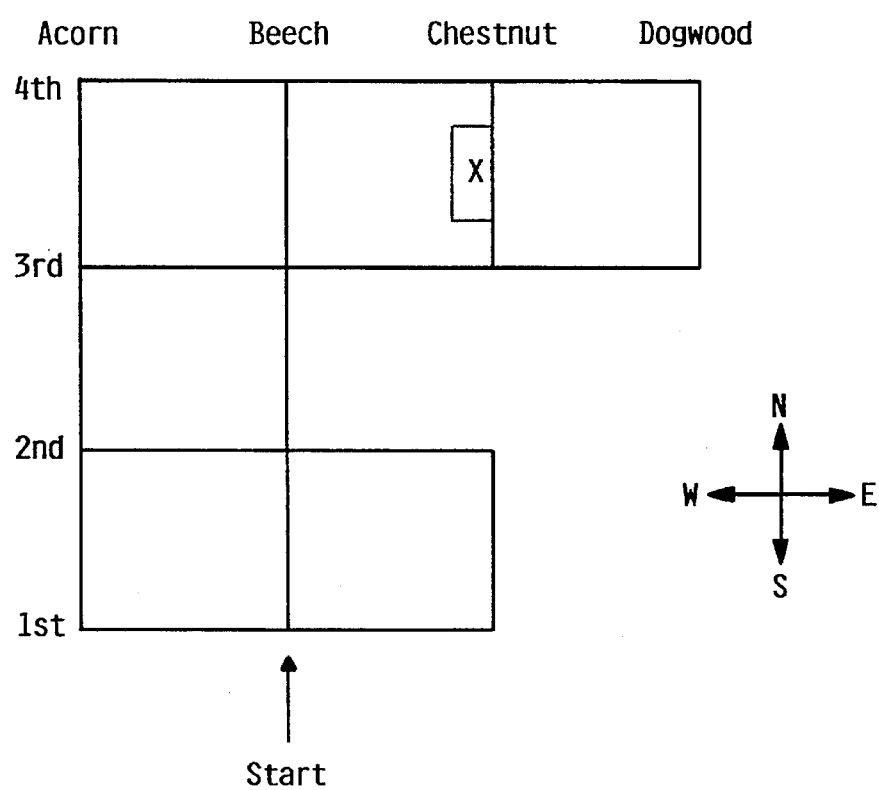
FIG. 4 shows a map learning example using the invention.

An example of how neural network model 20 of the invention can be used will now be described. In our example, we want neural network model 20 to control a robot to find the fastest route to an initially unknown location starting from a particular spot. Referring now to FIG. 4, let us assume that the network wants to get the robot from the starting point located at 1st and Beech to the pastry shop located on Chestnut between 3rd and 4th. We assume that the network must stay within the map fragment shown in the diagram. Initially the network knows nothing about the location of the pastry shop. The shortest route is to go north at 1st and Beech to 2nd and Beech, north at 2nd and Beech to 3rd and Beech, east at 3rd and Beech to 3rd and Chestnut, and finally go north at 3rd and Chestnut. Of course there are many other routes that would eventually get our network to the pastry shop—the job of the network and its underlying model is to guarantee that the shortest route is eventually found and remembered.

The network must make a decision at each intersection it comes to whether to go north, south, east or west (or some possibly legal combination, such as northeast). As previously discussed, network 20 doesn't receive reinforcement after each choice—it is not until it actually arrives at its goal (or reaches the end of a cycle due to a loop condition) does it know whether its decisions have been correct or not. Even then it does not know which of its decisions were absolutely correct and which could have been improved upon and which would have resulted in a shorter route.

The assumptions of the network architecture is that the network has a "state" unit corresponding to each intersection it encounters. That is, whenever the network reaches a particular intersection (e.g. 2nd and Acorn), exactly one state unit corresponding to that location will be activated. Thus there would be 14 state units corresponding to the 14 intersections on the map shown in FIG. 4. For convenience we might label these states A1, A2, A3, A4, B1, ... D4, with the goal state referred to as G. There are also four action units 40, 50, 60, and 70 corresponding to the four directions the network could choose at each intersection (North, South, East or West). In this example, certain combinations of action units may also be legal, for example, if both the action unit representing North and the action unit representing East are active at the same time, the output generator will attempt to move in a northeasterly direction. If a subset of active action units is illegal, either in the sense that combination doesn't make sense (West and East) or the particular intersection doesn't allow that particular direction, then the network is assumed to simply not move at all, and stays in the same state it was previously.

By the way, not only will the network learn the shortest route from 2nd and Acorn to the pastry shop, but as a (desirable) side effect, will very likely also have learned the shortest route from many other locations on the map to the pastry shop.

By way of illustration of this invention, the following will demonstrate how the invention achieves its learning objectives for the following scenarios:

—Initial exploration
—Loop detection
—Finding an initial path to the goal state
—Finding a better (or best) path to the goal state Initial exploration Let us assume the network starts its training procedure in state B1 (Beech and 1st). With all permanent weights and reinforcement baselines at 0, the first obstacle the network faces is simply learning how to get to another state, since of the possible action unit output combinations (16), only a few (3) are valid and will produce movement to another state. The other combinations will be rejected by the output generator 90 and as a result, the state will not change. This could be considered an example of a "degenerate" loop. For example, because of an unfortunate selection of temporary weights, both the North and South action units may be activated. In this case, output generator 90 recognizes the invalidity of that combination and the network remains at the same intersection. (The same would happen if an impossible direction, such as South, was selected). This is recognized by the network as a loop condition in block 104 causing this (very short!) cycle to end (END_CYCLE flowchart) immediately. Since no reinforcement was recorded, the reinforcement accumulators are all 0 and so no permanent weights are changed as a result of this cycle. The network has not learned anything yet. The network is "punished" to the extent that absolutely no reinforcement is provided to encourage the network to take this path again.

An alternate embodiment could provide punishment to a state for choosing a direction that resulted in a loop condition in the form of negative reinforcement (by adding negative units to the reinforcement accumulator values) instead of no reinforcement. This form of punishment could work well if all actions involve only one action unit being on and the rest off. However if it is possible for a valid action to be the result of more than one action unit being active at a time, then the punishment can be counterproductive. For example, let's say the best action in a particular state is for the network to move Northeast (requiring both the North and East action units to be active together). If instead the network picks just North and we punish that, then the North action unit is less likely to be active in that state, making it less likely that the combination of North and East will be on together in that state. Therefore, results will often be better if the "punishment" is in the form of no reinforcement for an inappropriate action instead of negative reinforcement for an inappropriate action, since that action might really be "part" of a correct response.

After some number of such degenerate cycles, the network will eventually select a set of temporary weight that cause it to select a valid direction from B1, say, west, which will move it to state A1 (Acorn and 1st). This causes a unit of reinforcement to be added to the reinforcement accumulator value for state B1 in each action unit (block 402 FIG. 3C). Now the network is in state A1 (Acorn and 1st) still within the same cycle. If the network now selects an invalid direction from A1 (which is likely) a "degenerate" loop will be detected and the cycle will end. However, since the reinforcement accumulator for state B1 has recorded a unit of reinforcement, (and since all reinforcement baseline values are still 0), this causes all action units to add temporary weights to the permanent weights for state B1 (block 504 FIG. 3D).

Now the network has learned something—changing the permanent weights for state B1 has created a tendency for the network to choose the direction west when in state B1. How strong this tendency is will depend on how the satisfaction index used to normalize the range of temporary weights in block 208 of FIG. 3B, as has been discussed.

The above effect will work similarly now that the network is in state A1; after perhaps several cycles of invalid selections, the network will happen to select a set of temporary weights that will move its, say, North, from A1 to A2 (Acorn and 2nd). Regardless of what happens after that, the network will have learned a tendency to move North at Acorn and 1st. Thus the network will gradually learn to pick valid responses for each of the states (intersections) it encounters; responses that will move it to a different state (intersection). Thus the "chain" of valid moves beginning from the original starting state (B1) will tend to grow longer and longer.

Loop Detection

As the chain of moves within a cycle grows larger, it becomes increasingly more likely (because the set of states is finite) that a "real" loop will be encountered within a cycle. For example, the network starts at state B1, and, due to a selection of temporary weight, goes wet (to A1), then north (to A2) then, east (to B2) and then south, which takes it back to the original starting state B1. This causes a loop to be detected (block 104 FIG. 3A) which causes the immediate end of cycle (END_CYCLE flowchart) and as a result, the reinforcement accumulator for state B2 remains at 0. Therefore the temporary weights that caused the network to move south at B2 do not become part of the permanent weight for B2. Hence no permanent tendency is created to choose south at Beech and 2nd.

Finding an Initial Path

As the chain of moves get longer (without looping) eventually (since there is only a finite number of states) the goal state will be achieved. Achieving the goal state (as detected by block 103 of FIG. 3A) causes all of the reinforcement accumulators for each state that has been visited during the cycle to receive N units of reinforcement (in this example, 14 units of reinforcement) in block 601 of FIG. 3E. A large amount of reinforcement guarantees that the temporary weights for all of those states will be added to the permanent weights. This creates a tendency for the network to follow the path the cycle took whenever the network encounters any state that was part of that cycle. For example, let's say a cycle starts at state B3 (Beech and 3rd) and a fortuitous selection of temporary weights cause the network to go east to C3 and then north to the goal. From now on, whenever the network is in B3 it will have a tendency to go east and when it is in C3 it will tend to go north. In fact, since no shorter path exists from either state to the goal state, that tendency will never be reversed. Now assume that when starting from the original starting state B1, the network has established a tendency to go west to A1, then north to A2 the east to B2. If it then goes north at B2, it will be in state B3 and its previously established tendency will then cause it to then go east to C3 and then north to the goal. This established a complete path from state B1 to the goal state, through the intervening states A1, A2, B2, B3 and C3, yielding a complete path to the goal of 6 steps.

Finding a Better (or Best) Path

The path the network has learned takes if from the initial starting state (B1) to the goal, but it is far from optimal. However, while the network has a tendency to follow that path, it is not absolutely locked into it. Any cycle could produce a set of temporary weights which causes it to veer off the learned path for a cycle. Achieving the goal state fairly regularly has resulted in a high satisfaction index, which makes this exploration much less likely then before. However the possibility for exploration does exist; it has just been attenuated. For example, it is possible that instead of going west from B1, the network happens to select north instead. This takes it to state B2 directly, skipping the intervening states A1 and A2. If the network now continues on the established path, it will arrive at the goal state in just 4 steps, 2 steps faster than the previously established path. At the end of this cycle, the reinforcement accumulator for state B1 will contain 2 units less reinforcement (because the fewer number of steps) but when divided by the history of B1 (END_CYCLE flowchart) and compared to the reinforcement baseline, it will always be larger (since the history value will be 2 units smaller). Thus the temporary weights for B1 will be incorporated into the permanent weight resulting in a new tendency for the network to go north at B1 rather than west. This shorter path now becomes the path for which the network has the greatest tendency. This shorter path also increases the satisfaction index since the goal state is being achieved more often (faster) thus the network is less likely to stray from the shorter path then it was from the previous longer one.

The process does not end there however. Assuming there is still some possibility left that the network will occasionally pick a different direction than the established path, there is still a chance to find an even shorter (or shortest) path. In our example, imagine that the network at some point picks a set of temporary weights that cause it to go northeast rather than north at state B2 (Beech and 2nd), and discovers a newly opened road between Beech and 2nd and Chestnut and 3rd. Using the logic described above, the resulting shorter path of just 3 steps would immediately supplant the 4 step path that had been learned. The satisfaction index would subsequently go up another notch, making it even less likely that the network would ever stray from this now shortest path. In this example, the threshold value is set high enough so that it cannot be exceeded by the satisfaction index, to always allow for the possibility of finding a shorter path.

If an obstacle is later detected on the path, the neural network then tries to find a way around the obstacle and (hopefully) back to a state from where it knows how to get to the goal state. The satisfaction index decreases, making experimentation more likely. If the obstacle is removed, the neural network eventually finds the old path and begins using that path again.

While this invention has been described with respect to the preferred embodiment and several alternate embodiments, it will be understood by those skilled in the art that various changes in detail may be made therein without departing from the spirit, scope and teaching of the invention. For example, the object controlled by the neural network model of the invention could be an automobile, an airplane, or even data that travels, such as a telephone call. If the object is data or any other similar non-physical entity, output generator 90 may contain a routing mechanism instead of stepper motors. Accordingly, the herein disclosed is to be limited only as specified in the following claims.

What is claimed is:

1. A neural network model used to control the movement of an object amongst a plurality of states from a first state to a goal state, said model comprising:

first learning means for learning a first path from said first state to said goal state;

means for detecting an obstacle in said first path; and second learning means for learning an alternate path from said first state to said goal state.

2. The neural network of claim 1, further comprising:

means for indicating a first level of satisfaction corresponding to said first path; and means for indicating a second level of satisfaction corresponding to said alternate path, wherein said second level of satisfaction is lower than said first level of satisfaction since said second path contains more states than said first path.

3. The neural network of claim 2, further comprising:

means for detecting that said obstacle in said first path has been removed; and means for overriding what was learned in said second learning means and relearning said first path.

4. A method for controlling the movement of an object amongst a plurality of states from a first state to a goal state, said method being performed through the aid of a neural network, said method comprising the steps of:

learning a first path from said first state to said goal state;

detecting an obstacle in said first path; and learning an alternate path from said first state to said goal state.

5. The method of claim 4, further comprising the steps of:

indicating a first level of satisfaction corresponding to said first path; and indicating, a second level of satisfaction corresponding to said alternate path, wherein said second level of satisfaction is lower than said first level of satisfaction since said second path contains more states than said first path.

6. The method of claim 5, further comprising the steps of:

detecting that said obstacle in said first path has been removed; and overriding what was learned in said second learning means and relearning said first path.

* * * * *